Dec. 23, 1941.  G. C. LYNCH  2,266,977
PORTABLE MIRROR DEVICE
Filed June 13, 1939
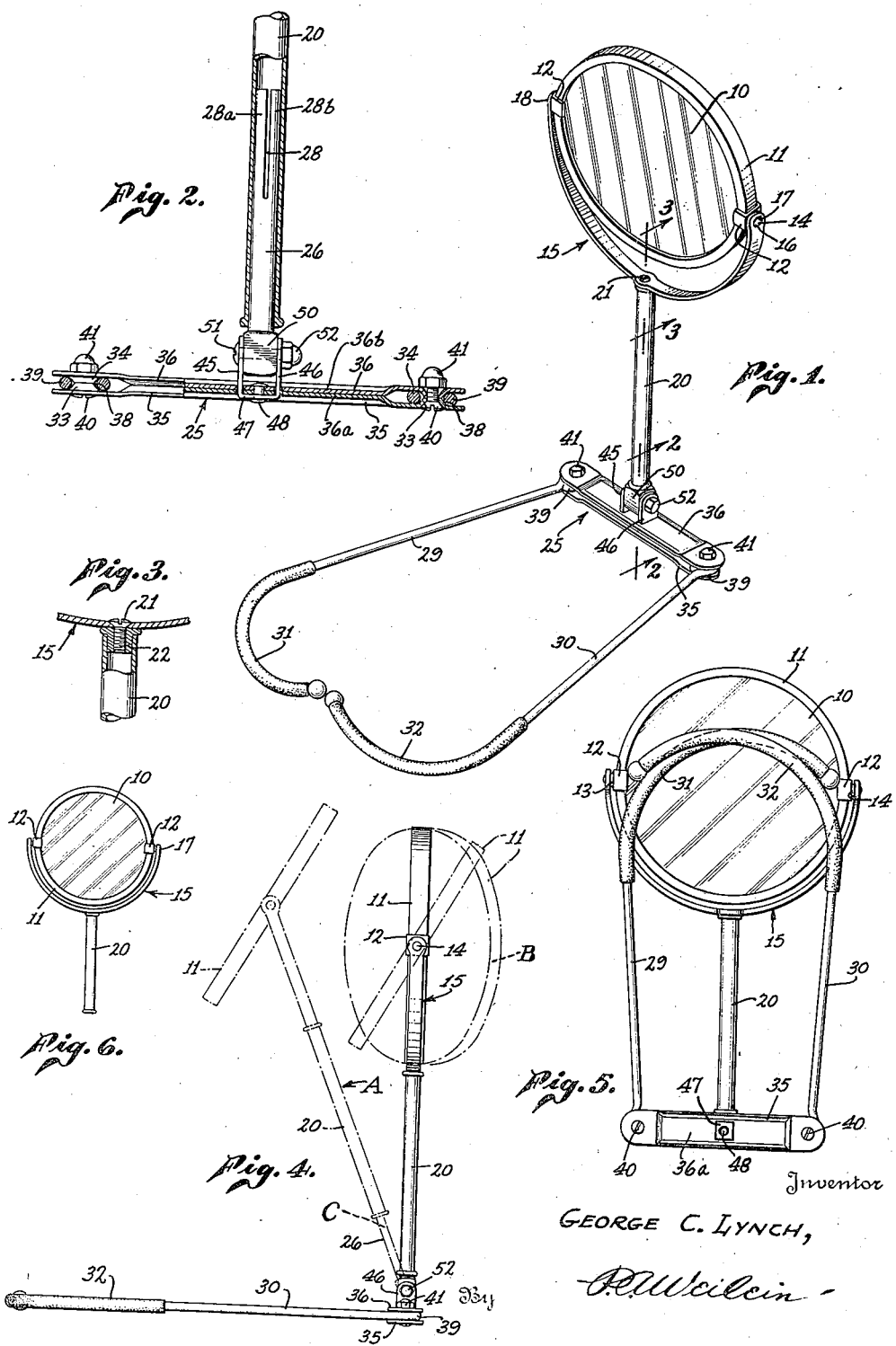
Inventor
GEORGE C. LYNCH,
Attorney Patented Dec. 23, 1941

2,266,977

UNITED STATES PATENT OFFICE 2,266,977

PORTABLE MIRROR DEVICE

George C. Lynch, Los Angeles, Calif.

Application June 13, 1939, Serial No. 278,889

1 Claim. (Cl. 88—101)

This invention relates to a portable mirror device; and more particularly to a portable mirror capable of being supported on the user.

It is an object of the present invention to provide a portable mirror construction capable of use either on a person, or resting on a supporting surface, and embodying means detachable and usable as a hand mirror.

It is a further object of the invention to provide in portable mirror construction, a mirror device detachably mounted on a base or support and adjustable in distance from the support, as well as rotatably with respect to said support about axes substantially perpendicular to each other.

A further object of the invention is the provision of friction pressure means associated with said support and cooperating with parts of the portable mirror for holding it in different positions of adjustment on said support.

Still a further object of the invention is the provision of common means for adjustably connecting the mirror to the support and to maintain parts of the support in assembled relationship.

It is a further object of this invention to provide common means for adjustably connecting the mirror to a support and for maintaining the members of the base in coplanar relation.

This invention possesses many other advantages and has other objects which may be made more easily apparent from a consideration of one embodiment of the invention. For this purpose there is shown a form in the drawing accompanying and forming part of the present specification. This form will now be described in detail, illustrating the general principles of the invention; but it is to be understood that this detailed description is not to be taken in a limiting sense, since the scope of the invention is best defined by the appended claim.

Figure 1 is a perspective view of a portable mirror device embodying the present invention.

Figure 2 is an enlarged sectional elevational view taken through the lower portion of the mirror construction as indicated at 2—2 of Figure 1.

Figure 3 is an enlarged fragmentary section taken as indicated by line 3—3 of Figure 1.

Figure 4 is a side elevation showing the device in different positions of adjustment.

Figure 5 is a view showing the device as it appears in collapsed position for shipment or when not in use; and, Figure 6 is an elevational view of the detachable portion of the device capable of being used as a hand mirror.

Referring to the drawing, the improved mirror construction contemplated by the present invention is shown embodied in a portable mirror device of the type capable of being supported upon a user. The device includes a mirror 10 held in a frame 11 carrying diametrically opposed clips or yokes 12 from which extend coaxial trunnions 13 and 14. By means of these trunnions, the mirror 10 and its containing frame 11 are pivotally held in the mirror holder 15 shown as being in the form of a curved member having holes 16 in its opposed end portions 17 and 18 for the reception of said trunnions to permit the pivotal adjustment of the mirror about the trunnion axes. The holder may be inherently tensioned so that the ends 17 and 18 frictionally engage the outer face of the clips 12 to maintain the mirror 10 in different angular positions of adjustment about said trunnions. The frame 11 is secured to one end of a tubular member 20 by a screw 21 passing through the holder 15 and threadedly engaging a plug 22 secured in the tube end, most clearly shown in Figure 3.

The aforementioned parts are carried by a support 25 through the agency of an elongated member or stem 26 (Figure 2), pivotally connected at one end to said support and telescopically connected with the tubular member 20 to permit their relative rotative and longitudinal movement, whereby the distance between the mirror and support can be varied, and the plane of the mirror rotated with respect to the support about the axis of said telescoping members. Additionally, the plane of the mirror may be adjusted angularly with respect to the support about the pivotal connection between said support and the stem 26.

The sliding connection between the tubular member 20 and the stem 26 permits the mirror 10, mirror holder 15, and said tubular member to be removed as a unit from the stem 26, and used as a hand mirror, the tubular member 20 then serving as a handle for the device. Figure 6 shows this portion of the device detached from the base for use as a hand mirror.

The stem 26 is preferably telescoped into the tubular member 20, as shown clearest in Figure 2, in order to prevent wearing and unsightliness of the exterior surface of the handle 20, which would occur if the stem 26 were hollow and slidably telescoped over the handle 20. In order to maintain the stem 26 and tubular member 20 in different positions of relative adjustment, both longitudinally and angularly, the upper end of said stem 26 is slotted at 28. The portions 28a and 28b of the bifurcation tend to spring outwardly and frictionally engage the inner wall of the tubular member 20 with sufficient pressure to hold said member in any position of adjustment on the stem. The provision of pressure means internally of the handle 20 eliminates the need for slotting or otherwise marring the exterior surface of the handle 20 in order to obtain the desired friction holding means between it and the stem 26.

In the form of the invention shown, the support 25 and mirror device mounted thereon are adapted to be supported from the neck of a wearer through a pair of cooperable hangers 29 and 30, pivotally connected at one end to the support 25 and having inwardly directed portions 31 and 32 adapted to cooperatively embrace the neck of the wearer. The pivotal connections between the hangers 29 and 30 and the support 25 are such as to permit the movement of said hangers and their inwardly directed portions to and from each other in a direction generally longitudinally of the axis of the pivotal connection between the support 25 and the stem 26.

The pivotal connections for the hangers 29 and 30 are formed by portions 33 and 34 extending inwardly from the respective plates 35 and 36 forming the support 25. The portions 33 and 34 may be frusto-conical and cooperatively form annular bearing surfaces 38 for end portions 39 of the hangers which are bent to snugly conform to said bearing surfaces. The engagement of said hanger portions with said bearing surfaces and the inner faces of the support plates 35 and 36 form effective friction hinges for the hanger ends which are held under pressure between said plates by the screws 40 passing through openings in the portions 33 and 34 and carrying clamping nuts 41. This construction also insures the maintenance of the hangers 29 and 30 in the plane of the hinge which is essential to proper support of the mirror device when the hangers are used cooperatively with the support 25 to form a base when the mirror is used other than upon the person, as for instance on a dressing table or the like.

The means connecting the support 25 and the elongated member 26 serves a two-fold purpose. Firstly, to provide a pivotal mounting for the member 26 and, secondly, to increase the rigidity of the support and insure against its twisting or becoming distorted during adjustment of the mirror device and hangers with respect thereto. In the specific construction shown, the plates 35 and 36 of the support are provided with inwardly formed channeled portions 36a and 36b which abut each other, as shown clearest in Figure 2. A stirrup or U-shaped member is provided with legs 45 and 46 passing through aligned openings in the plate portions 36a and 36b. The base 47 of the U-shaped member is rigidly secured to the plate portions 36a and 36b by a rivet or other suitable fastening element 48 passing through said base and said plate portions. The lower end of the elongated member 26 is provided with a portion 50 extending between the legs 45 and 46 of the stirrup and pivotally connected thereto by a bolt 51 passing through all of these parts and carrying a clamping nut 52 to insure proper friction hinging between the portion 50 of the stem 26 and the stirrup legs 45 and 46.

Due to the manner in which the hangers and elongated member 26 are mounted on the support 25, the device may be readily placed upon the wearer and removed therefrom without the necessity of twisting or otherwise maneuvering the device as a whole. This is due to the ability of the hangers to pivot about axes which are substantially at right angles to the pivotal axis of the elongated member 26 on the support. As heretofore explained, the hangers are movable in the plane of the support 25 and to a sufficient extent to permit the extremities of their inwardly curved portions 31 and 32 to clear the neck when applying the device to the wearer and when removing the same. The hangers are capable of sufficient movement toward each other to permit proper embracing of the neck by the curved portions 31 and 32, it being understood that the support 25 rests upon the chest of the wearer, cooperating with the hanger parts to form a rigid mounting for the mirror device, which is capable of a number of adjustments with respect to the wearer. The mirror 10 is not only adjustable toward and away from the wearer through the pivotal connection between the stem 26 and the support 25, but is adjustable rotatably on the stem 26 and is also adjustable on the stem to and from the support 25. This combination of movements permits an adaptation of a wide range of adjustments of the device, thereby imparting a maximum utility to the device.

When it is desired to utilize the hangers 29 and 30 cooperatively with the support 25 as a base, to support the device upon a dressing table or the like, the hangers may be sufficiently spread apart to effect a proper support, and all of the adjustments of the device may be effected that are possible when the device is supported on a wearer. As shown clearest in Figure 4, the mirror device may be moved angularly with respect to the hangers 29, 30 about the axis of the pivotal connection between the member 26 and the base 25, one such position of adjustment being indicated in the dotted line position A. Furthermore, the telescoping connection between the member 26 and the mirror handle 20 permits rotative adjustment of the mirror through 180° about the axis of the telescoping members, one position of adjustment being indicated by the dotted line position B. Additionally, the telescopic connection permits adjustment of the mirror 10 toward and away from the support 25, one position of adjustment being indicated at C.

As heretofore explained, the mirror device 10—15—20 may be removed completely from the elongated stem 26 and either mounted upon another type of base, or may be conveniently used as a hand mirror. The pivotal connections between the stem 26 and the support 25 permits the folding of the support 25 and hangers 29 and 30 onto the mirror device, as shown in Figure 5, to provide a flat and compact unit for shipping purposes or when the device is not in use.

I claim:

In a support for mirrors and the like of the type including a member adapted to rest against the chest of the user, a body engaging member pivoted to the chest engaging member, and a second member pivoted with respect to said chest engaging member for supporting a mirror or the like; a pair of opposed elements forming the chest engaging member and adapted to receive the body engaging member for pivotal movement therebetween, a U-shaped member having its legs passing through said opposed elements, a fastening element passing through the base of the U-shaped member and said opposed elements, and a support member pivotally connected at one end to a leg of the U-shaped member.

GEORGE C. LYNCH.